A. L. GRIFFIN.
VOTING MACHINE.
APPLICATION FILED SEPT. 18, 1911.

1,109,124. Patented Sept. 1, 1914.
9 SHEETS—SHEET 2.

Witnesses
Inventor Arthur L. Griffin
By J. A. Matthews
Attorney

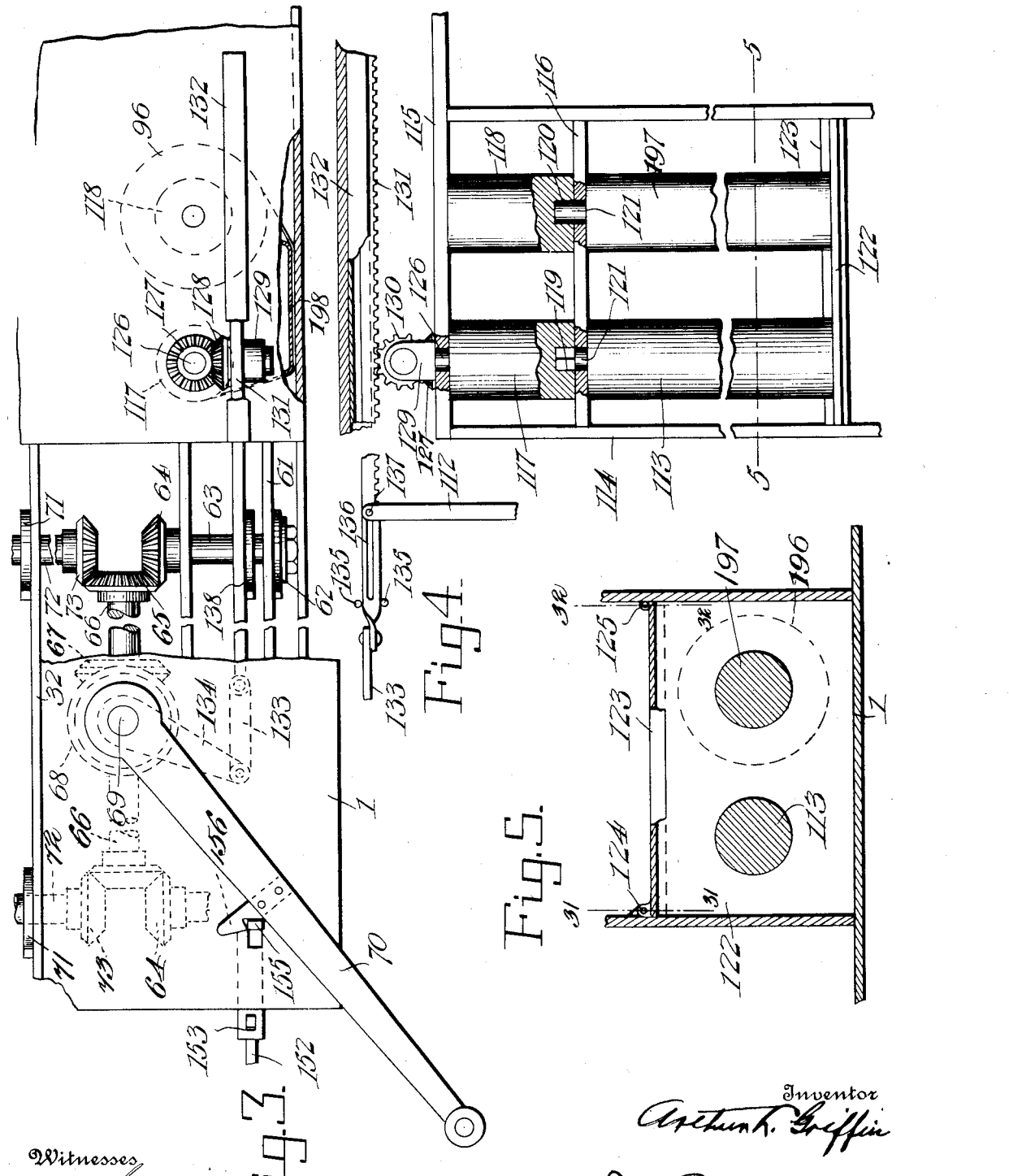

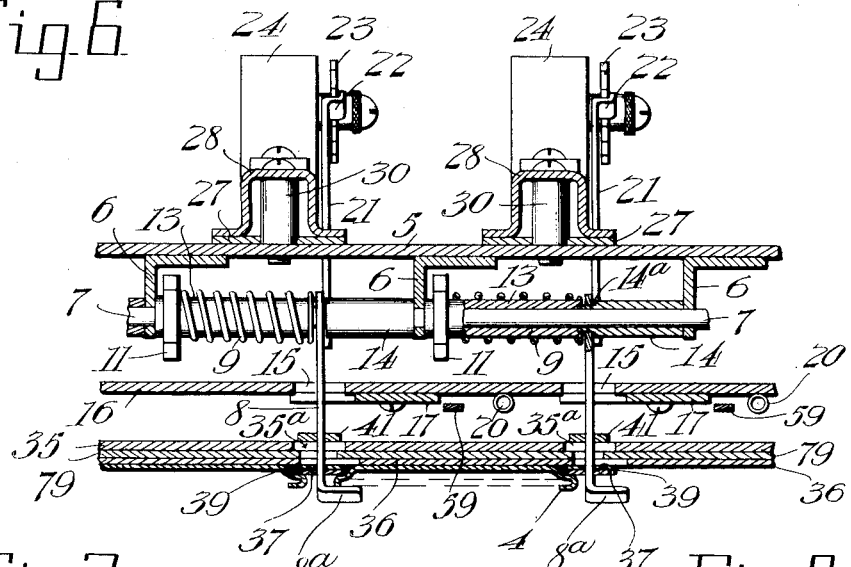
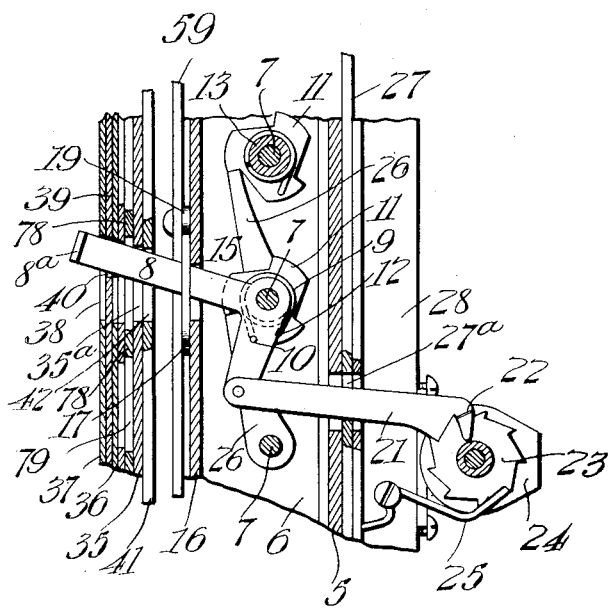
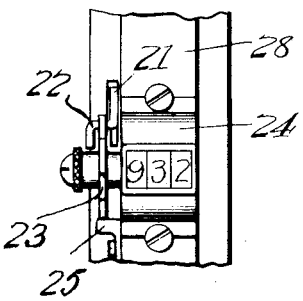

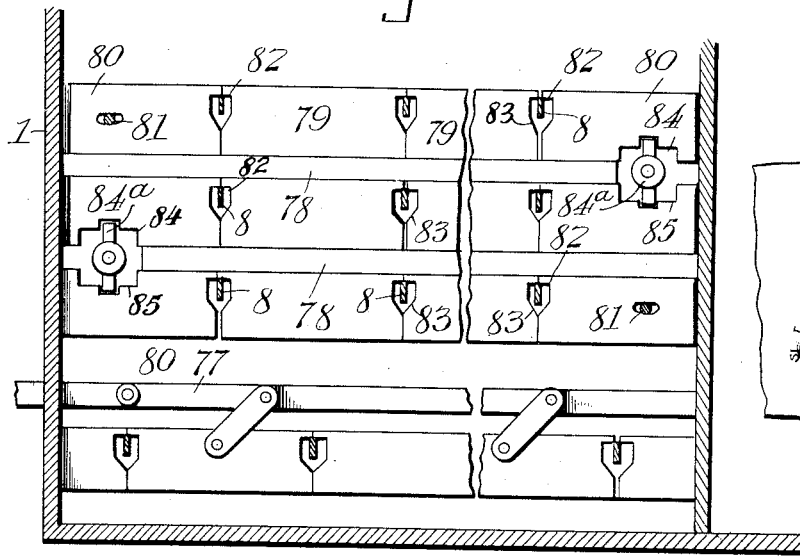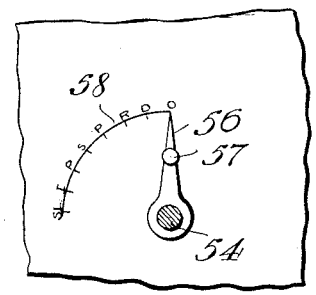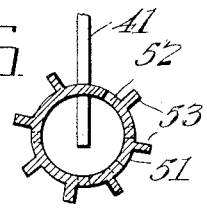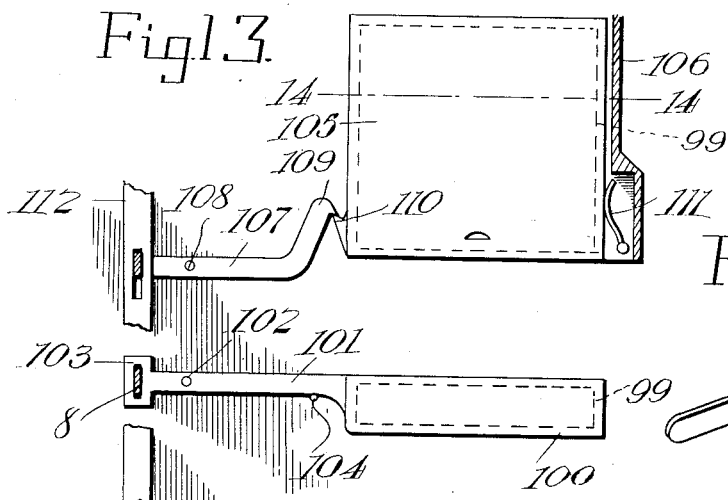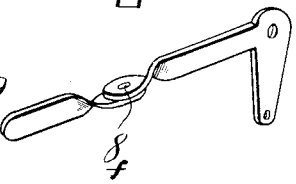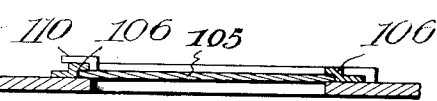

A. L. GRIFFIN.
VOTING MACHINE.
APPLICATION FILED SEPT. 18, 1911.
1,109,124.  Patented Sept. 1, 1914.
9 SHEETS—SHEET 6.
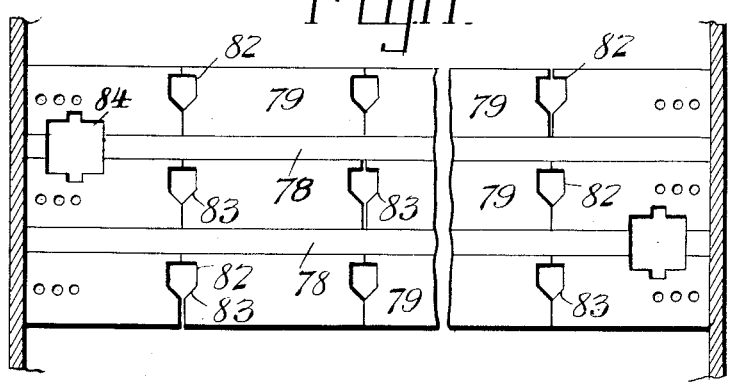
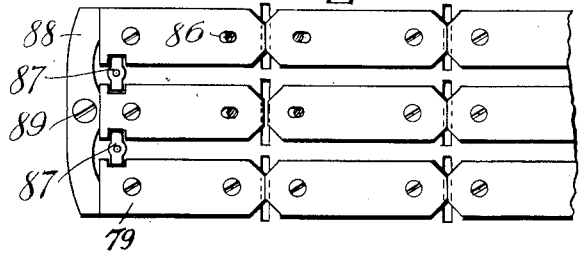
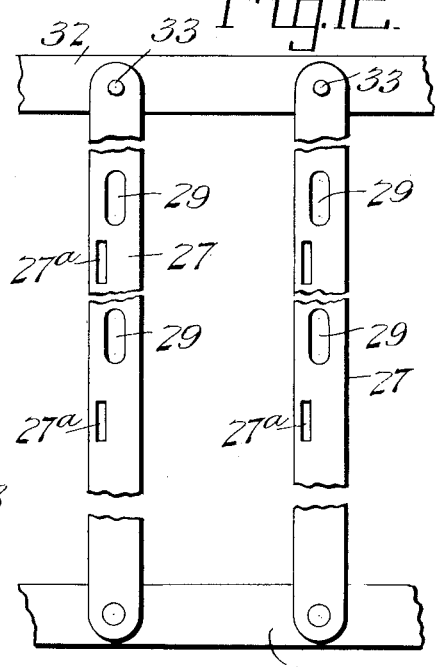
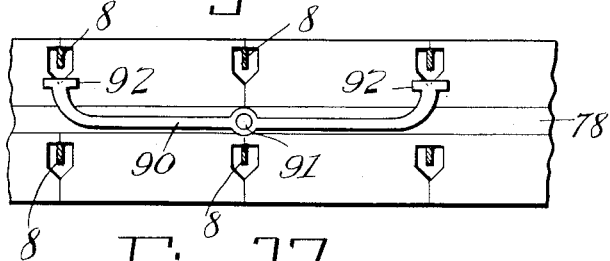
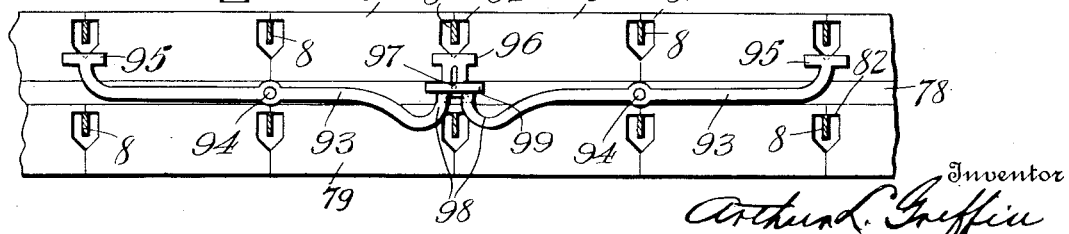
Witnesses
Inventor
Arthur L. Griffin
By J. A. Matthews
Attorney

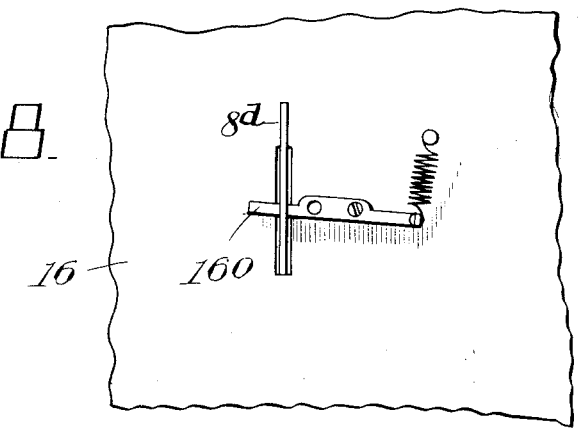
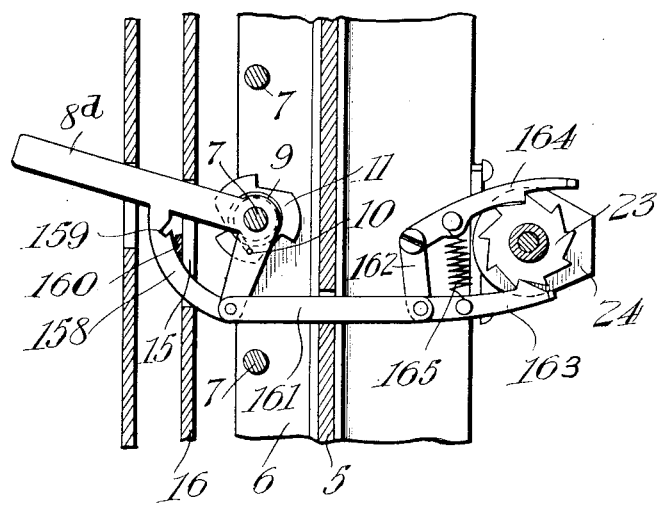
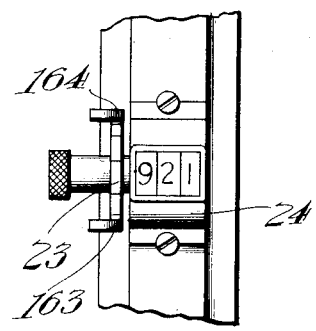

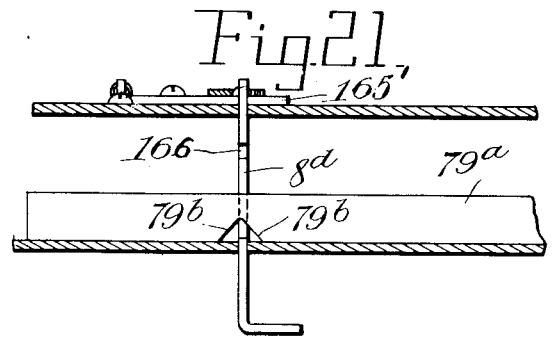
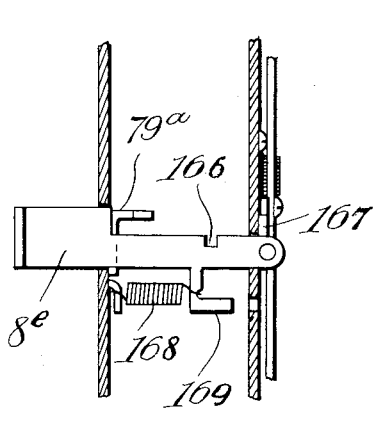
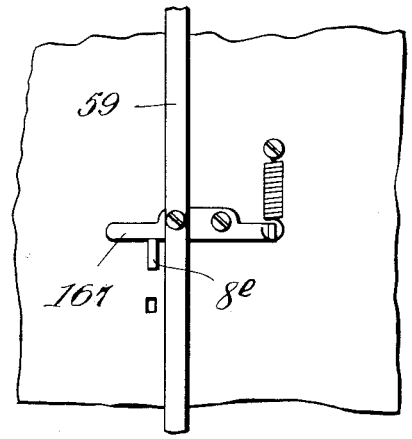
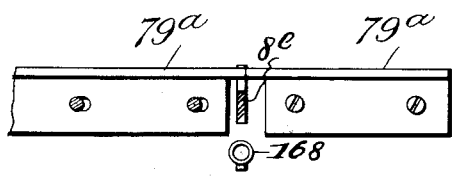

A. L. GRIFFIN.
VOTING MACHINE.
APPLICATION FILED SEPT. 18, 1911.
1,109,124.
Patented Sept. 1, 1914.
9 SHEETS—SHEET 9.
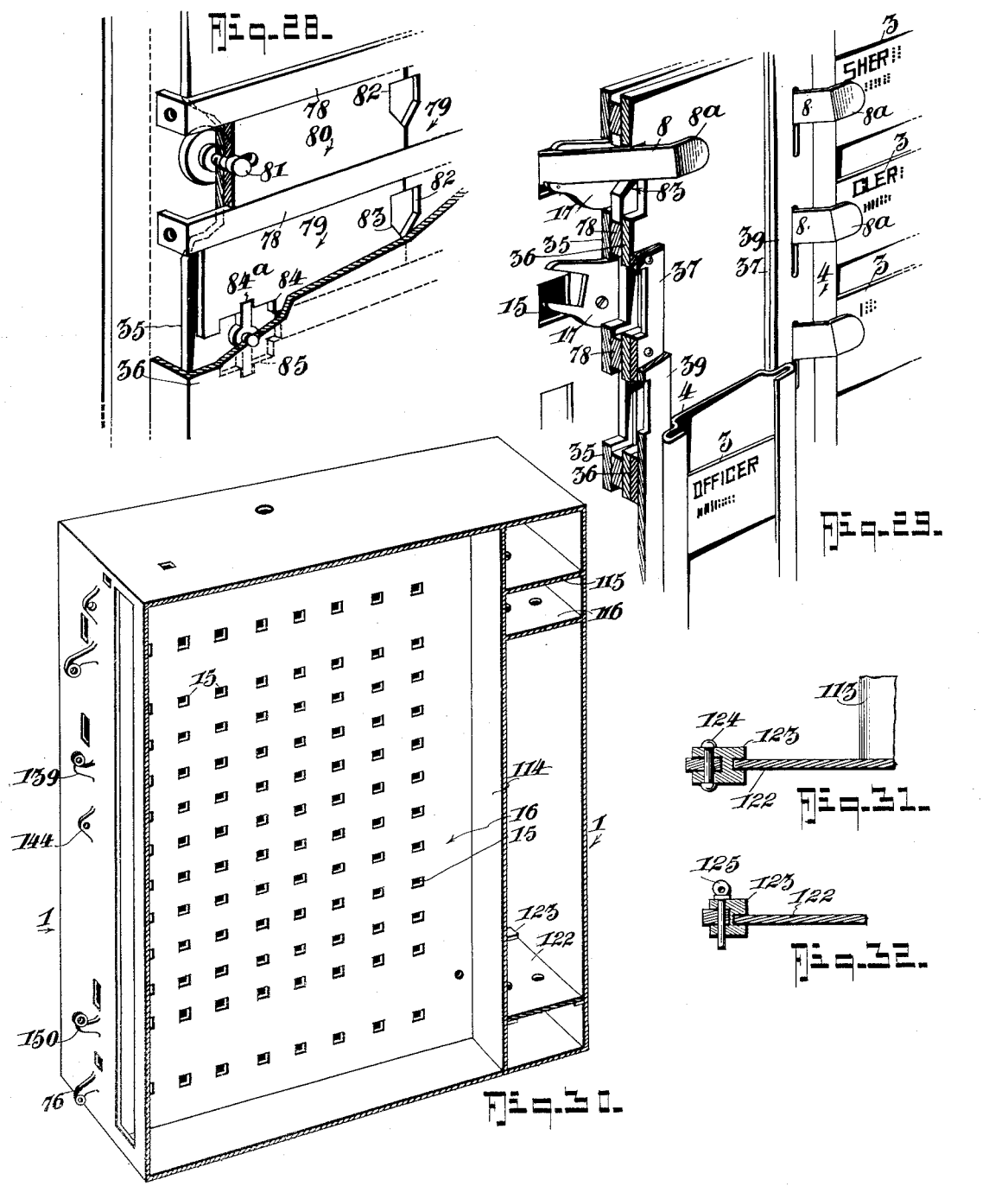
WITNESSES:
INVENTOR
A. L. Griffin
BY
ATTORNEY

UNITED STATES PATENT OFFICE.

ARTHUR L. GRIFFIN, OF MIDDLEBURY, INDIANA.

VOTING-MACHINE.

1,109,124.  Specification of Letters Patent.  Patented Sept. 1, 1914.

Application filed September 18, 1911. Serial No. 649,900.

*To all whom it may concern:*

Be it known that I, ARTHUR L. GRIFFIN, a citizen of the United States of America, residing at Middlebury, in the county of Elkhart and State of Indiana, have invented certain new and useful Improvements in Voting-Machines, of which the following is a specification.

The invention relates generally to voting machines being more specifically directed to the improvement and arrangement of certain details of construction, whereby to increase the certainty, efficiency, and capabilities of the operation.

One of the general objects of the invention is to simplify the straight ticket lockout, with the effect to provide a means of few parts to insure the positive locking against operation of all voting keys in the voting actuation of a straight ticket key.

A further object is the provision of means whereby all keys representing a candidate nominated by more than one party, as an indorsed candidate, both in a multicandidate group and in office rows, may be locked against voting operation by the actuation of any one of said keys in voting.

A further object is the provision of means whereby the voter may restore to normal or unvoted position any or all of the keys actuated by him in voting, whereby to permit the voter to change his vote or to correct a mistake therein before the final registration of his vote.

A further object is the provision of means to permit the voting machine to be officially set for use in restricted voting, as in primary elections.

With the above objects in view, the invention consists in certain details of construction and arrangement of parts which will be specifically described in the following specification, reference being had therein to the accompanying drawings, in which:—

Figure 1:
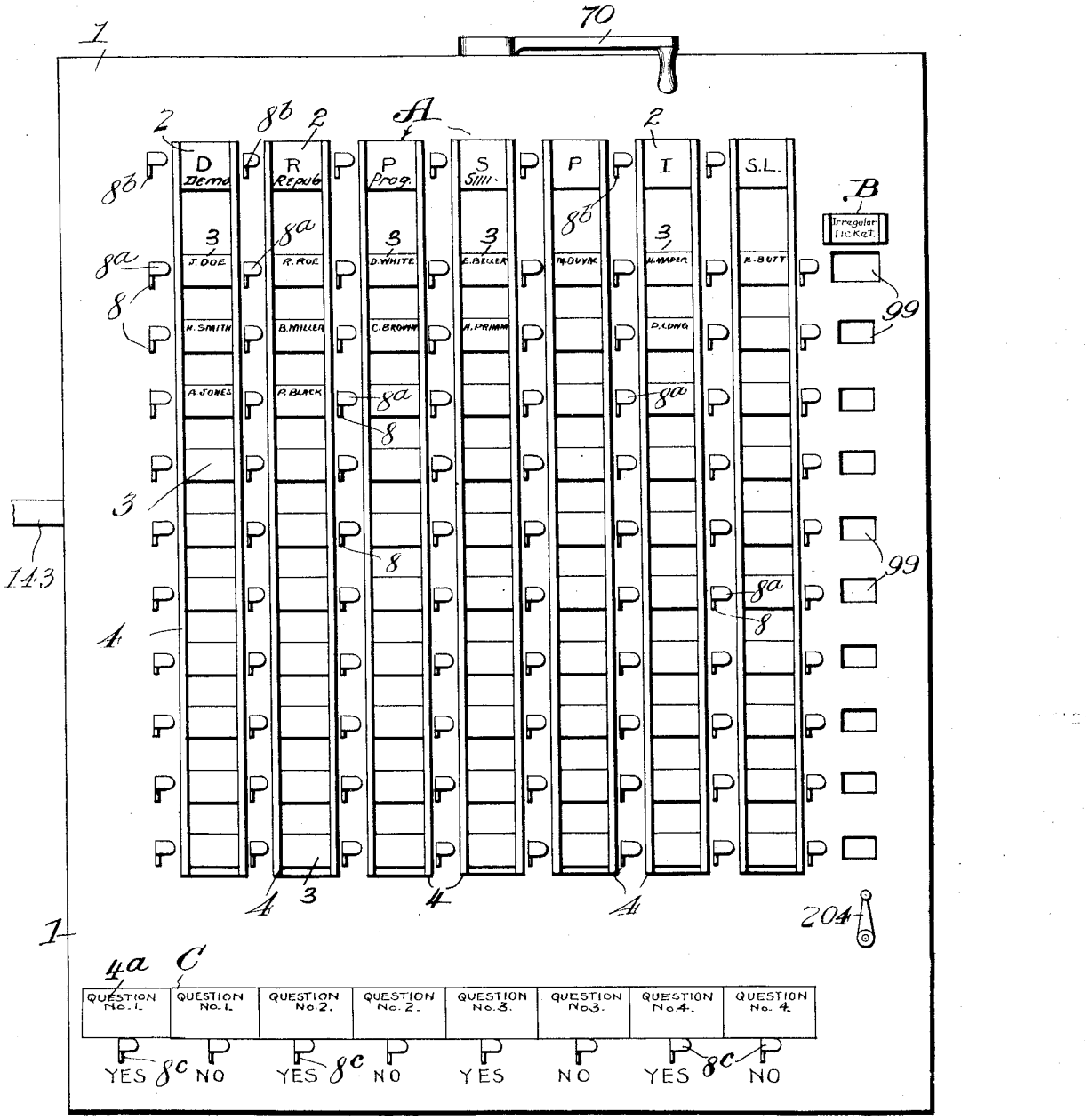
Figure 2:
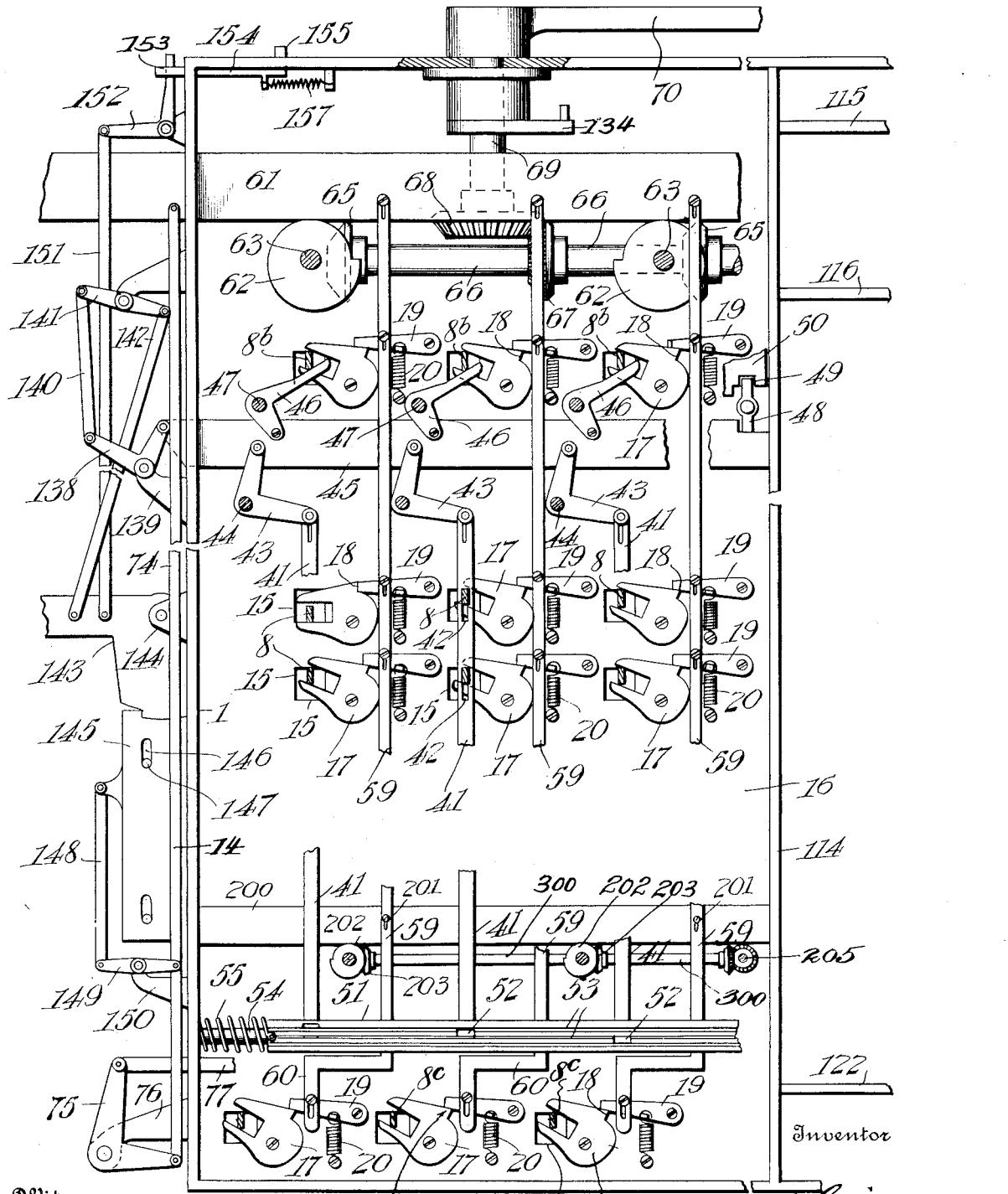

Figure 1 is a front view of the machine; Fig. 2 is an elevation showing the interior mechanism, parts of the mechanism being removed or broken away for clearness; Fig. 3 is a broken plan view; Fig. 4 is a detail showing the construction and operation of the paper rolls for the irregular tickets; Fig. 5 is a horizontal section on line 5—5 of Fig. 4; Fig. 6 is a detail transverse section of the machine; Fig. 7 is a detail vertical sectional view of the parts shown in Fig. 6; Fig. 8 is a detail perspective of one of the dogs for operating the register; Fig. 9 is a rear elevation of Fig. 7; Fig. 10 is a view illustrating the construction and operation of the sliding plates in a multicandidate group; Fig. 11 is a similar view, each row being independent as in straight office row voting as for governor of a State; Fig. 12 is a detail of the operating bars for the control of the registering dogs; Fig. 13 shows the construction of the covers for the openings in the irregular ticket column; Fig. 14 is a section on the line 14—14 of Fig. 13; Fig. 15 shows the dial of the primary voting mechanism; Fig. 16 is a transverse section of the tube of the primary voting mechanism; Fig. 17 is a modified form of operating key; Figs. 18, 19 and 20 are views of the further modified form of operating key and its connection with the register; Figs. 21, 22, 23 and 24 are views of a still further modification of the said key and illustrating a modified form of the sliding plates; Fig. 25 shows another form of sliding plate to be used only when it is necessary for one key to pass through said plates at a time; Figs. 26 and 27 illustrate modified means for locking one or more keys when a candidate in a multicandidate group is indorsed by more than one party. Fig. 28 is a detail perspective view partly in section showing the locking means for the end plates, hereinafter described. Fig. 29 is a similar view illustrating more clearly parts of the voting keys mechanism also hereinafter referred to. Fig. 30 is a detail perspective view of the voting machine frame the front plate being removed as well as all operative parts. Figs. 31 and 32 are detail sections on lines 31—31 and 32—32 on Fig. 5.

In the drawings, 1 represents the main casing designed particularly for housing the operating parts of the voting machine, and such casing, aside from the specific details hereinafter noted, may be of any size and shape. On the face of the casing are arranged the regular voting columns, designated generally by A, wherein the face plate is provided with longitudinally disposed or vertical guide-ways 4, preferably metallic plates having inturned edges. Each guide-way constitutes a party column, and supports slips or cards 3, bearing the names and offices of the particular party candidates. The cards at the extreme upper end of the guide-ways, particularly designated by 2, are party indicators, while the remaining cards are office indicators. In the present instance seven parties are shown, though any number are contemplated, and in this connection it is to be understood that the similar offices to be voted for are to be arranged in similar positions in each party column, so that while the party columns extend vertically of the machine the office rows extend transversely across the machine, or horizontally.

To one side of the regular voting columns is arranged an irregular voting column, designated generally by B; while below the regular voting columns are arranged the special question columns, designated generally by C; both the irregular and special question columns being more particularly referred to hereinafter.

To the rear wall 5 of the casing are arranged or secured angle brackets 6 (see Fig. 6), said brackets being disposed in rows transverse the machine, in alinement with the office rows. In each row of brackets is supported a plurality of shafts 7, hereinafter termed the key shafts, said shafts being coextensive with the length of the office rows and serving to support the respective voting keys 8. On each shaft 7 between adjacent angle brackets are loosely mounted longitudinally alined sleeves 13 and 14, there being provided such pair of sleeves for each voting key. The sleeve 14 is circumferentially reduced immediately adjacent the sleeve 13 to provide a bearing $14^a$ for the inner end of the key 8, said bearing being of somewhat greater length than the thickness of the key to permit a slight lateral movement of the key necessary in some conditions of the lock-out mechanism, as will later appear.

The voting key 8 is of angular form or L-shaped, being pivotally supported on the sleeve 14 at the junction of its arms, the main length of the key projecting toward and through the face plate of the machine, while the remaining length projects below the sleeve. Secured upon sleeve 13 near the end remote from the key 8 is a toothed wheel 11, to which is secured one end of a key tension spring 9, said spring being coiled about the sleeve 13, with its opposite end secured to the key at 10. The keys are thus put under tension in the voting operation, and will automatically return to normal or unvoted position when free to do so. The sleeves 13 of each row below the extreme upper row are also provided with dogs 26, designed respectively to engage the immediately overlying toothed wheel or ratchet 11, the purpose of such wheel or ratchet being to provide a convenient means for increasing the tension of spring 9 should the same be too weak for the prompt return of the key 8, the purpose of the dog 26 being to hold the ratchet 11 should the same be rotated in a clockwise direction to tighten the spring 9, as above explained. The ends of the voting keys beyond the face plate of the machine are turned or bent laterally, to provide both a convenient grip and to point toward the particular candidate card 3 to which a key corresponds. In this connection it will be understood that the keys 8 arranged adjacent the party indicating cards 2 are straight ticket keys, voting the entire number of party candidates, and are specially designated by $8^b$, while the remaining keys are candidate keys, voting only the particular candidate designated on the adjacent card, and will be indicated by $8^a$.

The special question column, which is arranged transversely of the casing, has indicating cards $4^a$ and a pair of voting keys, $8^c$, for each question card, one key being used for voting yes, and the other no, and each so marked. The keys of the special question column are identical in construction, connection to the casing structure, and operation with the voting keys previously described.

*Straight ticket lock-out.*—As is well understood in machines of this character means must be provided whereby on voting a straight ticket at least all of the keys in that particular party column must be locked against operation. In providing this mechanism I arrange a partition 16 within the casing in spaced, parallel relation to the rear wall 5, and in advance of the shafts 7. The keys 8 are adapted to project through openings 15 in the partition 16, and each key, immediately beyond the partition is embraced by a latch 17. The latch 17 is pivotally mounted on the partition and is formed with a slot through which the key passes, said latch having a shoulder 18 formed thereon, adapted when the latch is in lowered position, that is, in the position assumed when actuated by the key in voting, to be engaged by a dog 19 pivoted to the partition 16, and normally drawn toward latch-engaging position by a spring 20 secured to the partition and to the dog 19. From this construction it will be obvious that so far as the latch mechanism is concerned any key when depressed at its forward end for voting will be automatically locked against returning to normal position. Immediately beneath the straight ticket keys is arranged a bar 45 for limited sliding movement transverse the casing. Pivotally secured to the partition 16, immediately above the bar 45 are angle levers 46, said levers being pivotally connected to the partition at 47 with their short arms pivotally connected to the bar 45, and their long arms underlying the straight ticket keys. In the normal position of the parts the operative ends of the levers 46 engage the straight ticket keys when the latter are in normal position, so that the depression of any straight ticket key will operate the bar 45.

A series of bars 41 are arranged between the partition 16 and the face plate of the machine, one bar for all of the keys of each party column other than the straight ticket key and question keys. These bars 41 are connected at their upper ends to the bar 45 by angle levers 43, pivoted at 44 to the partition 16, and each bar is longitudinally slotted at 42, the slots being of a length coextensive with the extent of movement of a particular key in the voting operation. The bars are connected to the angle levers through slotted openings to permit independent movement of the bars, and the slots 42 are so positioned that when the parts are in normal positions the voting movement of any particular key is permitted without influencing the bar 41.

From the above described operation it is obvious that in the movement of a straight ticket key the lever 46 is rocked on its pivot with the effect to laterally move the bar 45, and through the angle levers 43 lift the bars 41 so that the lower walls of the slots of said bars are brought into engagement with the keys, and the latter locked against operative movement. This construction which is illustrated more particularly in Figs. 2 and 6 provides an effective lockout for all the candidate voting keys upon the operation of any straight ticket key.

*Voters' unlock mechanism.*—As shown more particularly in Figs. 2 and 1 I have shown a means whereby the voter can, prior to his leaving the voting machine, restore to normal position the voted keys to permit him to correct an error or change his vote. This mechanism includes a series of bars 59 extending in parallelism with the party colums immediately adjacent and in advance of the partition 16, which bars are connected at their upper ends to a transverse bar 61, designed to be operated by the main handle 70 as hereinafter explained. To permit vertical movement of the bars 59 without operating the bar 61, as is the case when the voter desires to correct or change his vote, the connections between said bars 59 and the bars 61 is through a slotted opening formed in the bars 59. Each bar 59 is connected through the medium of slots formed therein and pins carried by the dogs 19, connected to all of the locking dogs of the particular party column, the lower end of each bar 59, or so many of them as may be necessary being formed with an offset terminal 60 connected to the locking dogs of the special question column. Near their lower ends the bars 59 are connected through the previously described pin and slot connection at 201 with a transversely arranged bar 200. This bar is supported upon cams 202 mounted upon shafts, which through suitable gearing 203 is operatively connected to a shaft 300 in turn operated through gearing by a shaft 205 extending through the face plate of the machine and having an operating handle 204. From this construction it will be obvious that the voter may at any time prior to his leaving the voting machine operate the handle 204 with the effect to actuate the cams 202, elevate the bar 200 and thereby move upwardly the bars 59. By the upward movement of the bars 59 all of the dogs in locking position are elevated, releasing the latches 17 and permitting the voted keys to return to normal position under the influence of the springs 9.

*Registering mechanism.*—The means for registering the votes cast by the voter is, in its preferred form, shown more particularly in Figs. 6, 7, 8 and 9, and in somewhat modified form in Figs. 19, 20, 22 and 23. In the preferred form the rear or depending length of each key 8 is pivotally connected to one end of a dog 21, the opposite end of which is offset and formed to provide a tooth 22, arranged for coöperation with the actuating ratchet wheel 23 of any desired type of register 24, a spring 25 serving to prevent backward movement of the register. The registers are secured to the rear of the wall 5 of the casing and may be housed or otherwise protected in any desired manner. The dogs 21 project through openings appropriately formed in the rear wall of the casing, which openings are of a size to permit a vertical play of the rear or toothed ends of the dogs. Secured to the rear wall of the casing is a dog operating frame including vertical bars 27 one for each party row of registers, connected at their upper ends at 33 to a transverse operating bar 32 and at their lower ends to a transverse operating bar 31. The bar 32 is operated in the movement of the main handle 70 as will later appear. Each vertical bar 27 is formed with slotted openings 29 slidably embracing pins 30 secured to the rear wall of the casing, whereby to guide the bars in vertical movement. The bars are also provided with longitudinally arranged slots 27ª, each of which slots receive one of the dogs 21. All the dogs are thus connected with the operating frame described, and as will later appear, said frame is normally positioned so as to hold the rear ends of the dogs out of coöperating relation with the ratchets 23. In the operation of the handle 70, the frame is first lowered and then elevated, the lowering operation occurring before and the raising operation occurring after the actuation of the key release bers 59 under the influence of the bar 61. After a key has been voted it will be obvious that the toothed end of the dog connected therewith is moved rearwardly with respect to the rear wall 5 of the casing. In actuating the dog operating frame the voter, through the handle 70, first lowers the frame 27, thereby permitting the toothed end 22 of the dogs to engage a tooth of the ratchet wheel 23. The further movement of the handle elevates the bars 59 to unlock the keys, permitting the keys to return to normal position. This draws the dogs of the voted keys forward, moving the ratchet wheels of the registers corresponding to such voted keys one tooth, the dogs of the unvoted keys of course lacking this forward movement. A further movement of the handle 70 again elevates the dog operating frame to return the dogs to normal or elevated position. By the means described the registers of all voted keys, there being of course a register for each key, are automatically actuated by the voter upon leaving the voting machine.

*Key lock-out for office rows.*—The lockout for preventing operation of more than the predetermined number of keys in one or more of the office rows is shown particularly in Figs. 10 and 11, and in modified form in Figs. 26, 27 and 25.

Secured in spaced relation to the forward wall 35 of the casing is a face plate 36, formed with openings for the passage of the keys 8 therethrough. Above and below the horizontal or office row of keys are secured fixed strips 78, filling the space between the wall 35 and face plate 36 and providing slide-ways extending transversely of the machine. In the slide-ways, for each office row of keys are arranged a series of sliding plates 79, positioned end to end and having their adjacent ends formed together to provide an opening 82 through which the key 8 passes. The lower walls of this opening are downwardly convergent, as at 83, and the vertical length of the opening is such that in the full voting depression of the particular key, the lower edge of said key rides down below the opening and between the straight normally contacting edges of the plates 79. The plates are thus forced or crowded laterally. The respective end plates of each row are provided with one or more openings designed to receive a pin 81, which pin also seats in an opening formed in the face plate 35. It is thus obvious that the plates of any particular row may by the adjustable securing of the end plates thereof be so arranged as to permit of an aggregate movement of all of the sliding plates of a particular row to exactly correspond to the aggregate thickness of the number of keys a voter is permitted to operate in that particular row. When so adjusted it is obvious that upon the operation of the permitted number of keys all of the space possible to gain in the sliding movement of the plates has been taken up, so that no further operation of other keys in that row is possible.

For multicandidate group voting any number of rows may be set together, that is, where it is permitted to operate for example any six keys of three rows, the key lock-out mechanism may be set to permit the operation of any six keys of the three rows and lock out the remainder when such six keys shall have been voted. This is shown more particularly in Fig. 10, wherein the opposing end plates 79 of the desired number of rows, in this instance three, are adjustably secured by the pins 81 see Fig. 28 so that the aggregate sliding movement of all the movable plates will correspond to the aggregate thickness of the number of permitted keys. To distribute the sliding movement of the plates of any one row to the plates of the other protected rows I form in the end plate of the top row opposite the secured end, and in the underlying plate of the intermediate row a notch or recess 84 and 85, and mount on the face plate a pivoted latch 84$^a$ engaging the notches 84 and 85. A similar construction is provided at the opposite end of the intermediate row and in the underlying sliding plate of the lower row. Movement of the sliding plate of any row, when the full number of permitted keys have been voted, will thus be transferred to the sliding plates of the other protected row, so that when all of the permitted keys have been voted, no matter in what row or rows, the aggregate sliding movement of all of the plates has been taken up and the operation of additional keys prevented. The special question column is provided with similar lock-out plates which in this instance are connected by pivoted links to an operating bar 77, for a purpose which will presently appear.

In Fig. 25 I have shown a modification of the key lock-out in which the sliding plates are slotted for engagement with pins projecting from the face plate, as at 86, thereby dispensing with the necessity of the guide strips 78. In this modification, in addition to the latches, here shown at 87, the plates may be connected in alternate rows through the medium of a lever 88 pivotally mounted on the face plate at 89 and having its ends pivotally connected to the end plates of alternate rows. In connection with the lock-out, it will be understood that the showing in the drawing of the blocks of such lock-out is such as to indicate the possibility of the operation of the single key only, though it is to be understood that where two or more keys are to be permitted operation, the blocks will be correspondingly sized to permit movement of such keys prior to an endwise crowding of the blocks as to prevent operation of any other key.

In Fig. 26 a lock-out to prevent the operation of any one key in a row in which a particular other key has been operated is shown.

This consists of a lever 90 pivoted to the guide strips 78 and having upturned headed terminals 92 underlying the particular keys to be protected. As the lever is pivoted at its central point it is obvious that in the operation of one protected key, the head at the opposite end of the lever will be forced beneath the other protected key, and the latter held against operation.

In Fig. 27 is shown a construction wherein three particular keys of a row may be protected to permit the operation of only one of them. In this arrangement duplicate levers 93 are pivotally secured at 94 to the appropriate guide strip 78, the outer or remote ends of the levers having heads 95 underlying the end protected keys. The intermediate protected key overlies a sliding contact plate 96 operating upon the pins 97 secured to the guide strip, said plate being formed with a projecting lug 99 which overlies the relatively inner or adjacent ends of the levers 93. Upon the depression of the intermediate key for example, the inner ends of the levers are depressed and their headed outer ends raised beneath the remaining protected keys to prevent their operation. Upon the depression of either of the end keys, the lever underlying the same is operated forcing its inner end into contact with the lug 99. This movement swings the plate 96 upon the pin 97 as a pivot, forcing the head of the plate 96 against the intermediate key, while the opposite end of the lug 99 forces the inner end of the remaining lever downward to elevate the head 95 of such lever into a position to lock the remaining key against operation. These particular modifications are primarily used where a candidate of any one party has been indorsed by one or more additional parties, and such attachments are designed to be readily removable when not required for use.

In the selective lock-out shown in Figs. 26 and 27 the use of the levers 90 and 93 in addition to the lock-out blocks 79 provide a lock-out which will prevent the operation of the certain key or keys when a certain other key or keys has been operated and this without regard as to whether the lock-out blocks 79 would or would not permit the operation of such certain keys. In other words, the lock-out blocks might prevent the operation of more than two keys in a row, but with said blocks in two keys may be operated, while with the selective lock-out where a particular key has been operated, certain other keys may not be operated wholly independent of the lock-out blocks. The blocks serve their usual function with respect to all of the keys in the row, while the selective lock-out has its function only for particular keys.

*Irregular voting.*—The mechanism for irregular voting, that is, voting for a candidate whose name does not appear upon the regular tickets is illustrated particularly in Figs. 3, 4, 5, 13 and 14. The irregular votes are designed to be written upon a sheet of paper adapted to be wound upon a spool 197 feeding from the paper roll 196 thus provided, to a roll 113. The roll 113 and the spool 197 are mounted vertically of the machine in a section divided from the remainder of the apparatus by a vertical partition 114. The roll and spool are rotatably mounted in upper and lower horizontal partitions 116 and 122, the paper from the spool to the roll passing over a guide plate 198 (see Fig. 3), which plate extends vertically of the machine directly behind the openings 99 in the face of the machine, there being one opening for each of the office rows of the office mechanism. The openings 99 are normally closed by a plate 100, with the exception of the extreme upper opening, which in the particularly designed machine, may be preserved for presidential electors and is of greater size than the remaining openings. Each plate 100 is provided with an arm 101 extending laterally therefrom and pivotally mounted on the face of the machine at 102. The arm 101 of each plate has a head 103 slotted to embrace the voting key 8 corresponding thereto, so that in the depression of said key the plate is moved to expose the paper under the particular opening. A pin 104 limits the closing movement of the plate. The top opening 99, which is larger than the rest, is normally closed by a slide 105, guided in ways 106 and locked in its closed position by a lever 107 pivoted at 108, the slide having a lug 110 to be engaged by the hook end 109 of the lever. A spring 111 serves to maintain engagement between the lug and lever hook.

The pintles 121 of the roll 113 and spool 197 project through the horizontal partition 116 and engage respectively in the lower end of cylindrical members 117 and 118. The upper end of the members 117 and 118 are rotatably supported in a horizontal partition 115 arranged adjacent the upper wall of the casing but spaced therefrom to provide for the reception of the operation mechanism. The pintle 121 of the roll 113 is of angular contour above the partition 116 and seats in a correspondingly shaped recess in the lower end of the member 117. The upper end of the member 117, immediately above the partition 115 is through the medium of a stub shaft 126 projecting from the member 117 provided with a beveled pinion 127, meshing with an angularly related pinion 128 mounted in a bearing secured upon the partition 115, as 129. The beveled pinion 128 is also formed or connected with a spur gear 130.

Mounted in ways 132 secured to the top of the casing is a rack bar 131 formed to cooperate with the gear 130. One end of this rack bar is connected through the medium of a link 133 with an arm 134 connected to the main shaft 69 to be operated by the handle 70, as hereinafter described, so that in the movements of the handle 70 the gear is reciprocated. Adjacent its connection with the link 133 the rack is guided between pins 135 and is also formed adjacent its guided point with a longitudinally extending slot 136. A rack actuating bar 112 is connected at its upper end to the rack by a pin 137 operating in a slot 136 and said bar 112, which extends vertically of the machine is slotted to receive the bars of the voting key 8.

In operation of this part of the mechanism it will be obvious that the depression of any particular key 8 raises the closing plate of the opening 99 and simultaneously depresses the rack bar into engagement with the gear 130, so that in the operation of the lever 70 by the voter in leaving the machine said rack bar will actuate the roll 113 to wind thereon the paper used by the voter and arrange a fresh section of paper in rear of the opening. The return of the voting key to normal position, accomplished in a manner previously described, elevates the rack bar beyond engagement with the gear 130, so that if no irregular keys have been operated the movement of the lever 70 will not actuate the paper roll.

To release the rolls 113 and 197 as may be desired for any purpose I arrange the lower partition 122 upon a channel bar 123 which projects to underlie the partition 122. The channel bar 123 is hingedly connected to the partition 114 at 124, and may be locked or otherwise secured at the opposite end, as at 125. Upon the outward swinging of the channel bar the partition 122 is free to be removed and thereby permit the convenient release of the roll and spool.

*Resetting mechanism.* — The resetting mechanism is shown particularly in Figs. 2 and 3, and includes a main shaft 69 on which above the upper wall of the casing is fixed the main operating lever 70 designed to be operated by the voter on entering and leaving the machine. Immediately below the top wall of the casing the arm 134 of the irregular resetting mechanism is secured, and below this arm there is secured to the shaft 69 a beveled pinion 68 connected through the medium of the beveled pinion 67 with a shaft 66, on which said beveled pinion 67 is secured. The shaft 66 carries a beveled pinion 65 coöperating with beveled pinions 64 and 73 mounted on shafts 63 and 72, respectively, there being preferably two such shafts 63 and two such shafts 72. The shafts 63 are provided with cams 62 which underlie the bar 61, heretofore described as connected with the unlocking bars 59 which after actuation permit the resetting of the voted keys.

The shafts 72 carry cams 71 which are designed to underlie the uper bar 32 of the dog operating frame of the registering mechanism. The respective cams 62 and 71 are formed with such cam surfaces that in their operation the dog operating frame descends and rises in the movement of the lever 70 in its operation by the voter in leaving the machine, while the bar 61 rises intermediate the lowering and raising of the frame 27 to release the keys for return to normal position immediately succeeding the lowering movement of the frame 27. By preference, the connection of the shaft 69 with the gear 68 is through a clutch mechanism so that the lever 70 in the movement effected by the entrance of the voter will not operate any cam mechanism referred to.

*Official control.* — The official control lever 143 is mounted upon a bracket 144 secured to one of the side walls of the machine and has a depending notch portion to be engaged by a latch 145 slidably mounted through slots 146 therein engaging pins 147 projecting from the machine casing. The latch 145 is connected by a bar 148 to a lever 149 pivoted to a casing bracket 150, the opposite end of the lever 149 being connected to a rod 74 which at the upper end is connected to the bar 61 and at the lower end to an angle lever 75 supported on a casing bracket 76 and in turn connected to the lock-out control bar 77 for the question column. A lever 141 is pivotally mounted upon the casing bracket above the official control lever 143, one end of the lever being connected by a bar 142 to the official control lever and the opposite end of said lever 141 connected by a bar 140 to one end of an angle lever 138 supported on a casing bracket 139 with its opposite end connected to the straight ticket lock-out bar 45. The official control lever is also connected by a bar 151 to a casing bracket supported angle lever 152, the free end of which projects through an opening 153 in the main lever latch 154. This latch has a locking nose 155 designed to engage a latch 156 projecting from the main lever 70, a spring 157 serving to normally maintain an engagement. When the lever 70 is operated to raise the bar 61 the slide latch 145 is depressed through the bar 74, lever 149 and bar 148. The official control lever is then swung up on its pivot, which through the rod 142, lever 141, rod 140 and lever 138 moves the straight ticket lock-out bar 45 laterally and locking all keys against operation. When the machine is to be set for the next voter the proper official by pulling down upon the official lever 143 releases the keys and permits the entering voter to have control of the same for voting purposes.

*Restricted vote control.* — To provide for locking out certain of the rows of party column keys when necessary, as in restricted voting or primary elections, I provide a simple attachment for the machine which will selectively accomplish the purpose in an expeditious manner. A shell-like body 51 is mounted in the casing beneath the lower ends of the locking bars 41, said shell being circumferentially formed with a series of openings 52, arranged in offset planes longitudinally of the body. The openings are of a size to receive the ends of the rods 41, when the body has been turned to aline a particular opening with the overlying rod. By reason of the offset arrangement of the openings it is obvious that but one opening can be in rod receiving position in any one position of the body. Therefore, all of the rods 41, except the one in register with the alined opening, are held elevated or in key-locking position, as previously explained. In this connection it is to be understood that the diameter of the shell is such that the surface when in engagement with the rods 41 will hold said rods elevated, that is the keys locked, and to prevent accidental movement of the rods so held the shell is provided with longitudinal ribs 53. The shell has a tube-like rod 54 as a support at one end, and a tension spring 55 surrounds the rod and is connected thereto and to the shell, to tension the shell as desired. The shaft of the opposite end of the shell extends through the casing, and is provided with a pointer 56, having an operating knob 57, and moving over an indicating strip 58 secured to the casing. The indicating strip is marked in accordance with the party columns, so that when the pointer registers with a particular indicating mark, the party column locking rod 41 corresponding thereto is free to move through the opening in the shell, while the remaining rods 41 are held in locked positions. By turning the pointer, the proper official can set the machine for restricted voting as desired in the particular case.

*Key protector.*—To protect the keys from being tampered with from outside the machine, I prefer to provide a strip 37 to be secured to the face of the casing and cooperating with each vertical row of keys, the strip being formed with slots to permit full play of the keys. Over the strip 37 is arranged a sliding cover plate 39, one for each key, the opening in which plate is of just sufficient size to permit the passage of the key therethrough. The key openings are thus closed and the interior mechanism protected.

*Modifications.*—In Figs. 18, 19, and 20 is illustrated a modified form of operating or voting key. This key 8ᵈ has its arms connected by a segment 158, formed with a notch 159 to engage a spring operated latch 160, pivoted on the partition 16 of the machine. In the operation of the register this form of key is provided with a dog 163, connected with the key by a bar 161, the latter being also connected by a link 162 with a second dog 164. A spring 165 holds both dogs in contact with the teeth of the ratchet, one engaging said teeth from above, and the other from below. The operation of the voting key in this form will simultaneously actuate the register.

Another form of voting key is illustrated in Figs. 21, 22, 23, and 24, wherein the key 8ᵉ is a push key, sliding back and forth through openings in the casing wall. The key is formed with a notch 166 to engage a spring-operated latch 167 when said key is pushed inwardly or voted. A spring 168 secured to the casing wall and to an arm 169 of the key returns said key to normal position when unlocked. Both latches of the modified forms of keys may be released by means similar to the preferred form of unlocking means. In the use of the last form of voting key the lockout plates for the keys of a horizontal row are angle plates having horizontal and vertical portions with the wedge-shaped recesses formed in the horizontal portions, as at 79ᵇ, Fig. 21. Instead of mounting the key for independent lateral movement as in the preferred form, I may form said key with a pivotally connected operating end as shown at 8ᶠ, in Fig. 17.

It is believed that the operation of the various parts of the structure in voting will be fully apparent from the above detailed description.

What is claimed is:—

1. In a voting machine, a series of voting keys arranged in horizontal and vertical rows, a horizontal row of straight ticket keys, a dog mounted on the machine adjacent each key and operatively connected with the latter, a latch mounted in the machine and adapted to engage and lock the dog to secure the key in a predetermined position, a lock bar coöperating with each vertical row of keys other than the straight ticket keys, each of said bars being slotted to permit independent movement of the keys when the bars are in normal position, and means actuated by the straight ticket key to operate the locking bar of the vertically alined remaining keys whereby to lock all of said latter keys against movement.

2. In a voting machine, a series of voting keys arranged in horizontal and vertical rows, a horizontal row of straight ticket keys, a dog mounted on the machine adjacent each key and operatively connected with the latter, a latch mounted in the machine and adapted to engage and lock the dog to secure the key in a predetermined position, a lock bar coöperating with each vertical row of keys other than the straight ticket keys, each of said bars being slotted to permit independent movement of the keys when the bars are in normal position, a bar mounted for movement transverse the machine, an angle lever intermediate said bar and each of said locking bars, and a lever intermediate said bar and each of the straight ticket keys, whereby to elevate the locking bars in the actuation of any straight ticket key.

3. In a voting machine, a series of voting keys arranged in horizontal and vertical rows, a horizontal row of straight ticket keys, a dog mounted on the machine adjacent each key and operatively connected with the latter, a latch mounted in the machine and adapted to engage and lock the dog to secure the key in a predetermined position, a lock bar coöperating with each vertical row of keys other than the straight ticket keys, each of said bars being slotted to permit independent movement of the keys when the bars are in normal position, a bar mounted for movement transverse the machine, an angle lever intermediate said bar and each of said locking bars, a lever intermediate said bar and each of the straight ticket keys, whereby to elevate the locking bars in the actuation of any straight ticket key, and means adapted for manual operation to elevate any predetermined number of said locking bars to locking position, whereby to cut out certain rows of keys.

4. In a voting machine, a series of voting keys arranged in horizontal and vertical rows, a horizontal row of straight ticket keys, a dog mounted on the machine adjacent each key and operatively connected with the latter, a latch mounted in the machine and adapted to engage and lock the dog to secure the key in a predetermined position, a lock bar coöperating with each vertical row of keys other than the straight ticket keys, each of said bars being slotted to permit independent movement of the keys when the bars are in normal position, a bar mounted for movement transverse the machine, an angle lever intermediate said bar and each of said locking bars, and a lever intermediate said bar and each of the straight ticket keys, whereby to elevate the locking bars in the actuation of any straight ticket key, a shell mounted in the machine below the locking bars and formed with openings to coöperate with and permit movement of said bars, and means for manually adjusting said shell to provide for operation of any predetermined number of said locking bars.

5. In a voting machine a casing, a series of rods mounted transversely therein, a series of sleeves mounted on each rod, a voting key mounted on each sleeve, a spring encircling the sleeve and connected at one end to the key, a ratchet fixed on the sleeve, and means projecting from each sleeve for engaging the ratchet of the key immediately thereabove.

6. In a voting machine a casing, a series of rods mounted transversely therein, a series of sleeves mounted on each rod, a voting key mounted on each sleeve, a spring encircling the sleeve and connected at one end to the key, a ratchet fixed on the sleeve, means projecting from each sleeve for engaging the ratchet of the key immediately thereabove, a register carried by the casing, a dog connected to the key and adapted to actuate the register, and means carried by the casing and adapted for manual operation to normally hold the dog out of coöperation with the register independently of the key.

7. A voting machine including a casing, said casing being formed with a series of irregular vote-openings, a voting key arranged adjacent each opening, a spool mounted in rear of the opening and carrying a roll of paper, a roll arranged in rear of the opening to receive the paper from the spool, a gear connected to the roll for revolving the latter to wind the paper thereon, a manually operable rack designed to coöperate with the gear, a bar extending from the key to the rack and holding said rack out of coöperation with the gear when the key is in normal position, said bar drawing the rack into coöperation with the gear in the voting movement of the key.

In testimony whereof I affix my signature in presence of two witnesses.

ARTHUR L. GRIFFIN.

Witnesses:
T. G. ANDERSON,
W. E. GRINER.